(12) United States Patent
Evans (10) Patent No.: US 11,505,274 B2
(45) Date of Patent: Nov. 22, 2022

(54) BALANCING VEHICLE AND CONTROL METHOD THEREFOR

(71) Applicant: Shenzhen Haojieli Industrial Co., Ltd., Shenzhen (CN)

(72) Inventor: Oliver Stuart James Evans, Hong Kong (CN)

(73) Assignee: Shenzhen Haojieli Industrial Co., Ltd., Shenzhen (CN)

( * ) Notice: Subject to any disclaimer, the term of this patent is extended or adjusted under 35 U.S.C. 154(b) by 579 days.

(21) Appl. No.: 16/499,865

(22) PCT Filed: Mar. 30, 2018

(86) PCT No.: PCT/CN2018/081435
§ 371 (c)(1),
(2) Date: Sep. 30, 2019

(87) PCT Pub. No.: WO2018/177430
PCT Pub. Date: Oct. 4, 2018

(65) Prior Publication Data
US 2020/0108885 A1  Apr. 9, 2020

(30) Foreign Application Priority Data

Mar. 31, 2017 (CN) .......................... 201710206692.9

(51) Int. Cl.
*B62K 11/00* (2006.01)
*B62K 1/00* (2006.01)
(Continued)

(52) U.S. Cl.
CPC ............. *B62K 11/007* (2016.11); *B62J 45/20* (2020.02); *B62J 50/22* (2020.02); *B62K 1/00* (2013.01);
(Continued)

(58) Field of Classification Search
CPC ........ B62K 11/007; B62K 1/00; B62K 11/02; B62K 15/00; B62K 23/02; B62K 23/08;
(Continued)

(56) References Cited

U.S. PATENT DOCUMENTS 7,963,352 B2 * 6/2011 Alexander ........... B62K 11/007
180/21
8,800,697 B2 * 8/2014 Hoffmann ............ B62K 11/007
180/21

(Continued)

Primary Examiner — John D Walters
Assistant Examiner — Hilary L Johns (57) ABSTRACT

A balancing vehicle includes a wheel, a bracket, a frame, a shock absorbing member, pedals, a control rod, and a handle. The bracket is fixed to an axle of the wheel. The frame is slidably connected to the bracket through a slider fixedly connected to the bracket, so as to allow the frame to slide relative to the bracket. The shock absorbing member is disposed between the frame and the bracket, and is configured to cushion relative movement between the frame and the bracket. The pedals are fixed to the frame. The control rod is configured to move back and forth in a direction of travel. The balancing vehicle accelerates when the control rod is pushed forward in the traveling direction, and the balancing vehicle decelerates or retreats when the control rod is pulled backward in the traveling direction. The handle is coupled to a top of the control rod.

11 Claims, 6 Drawing Sheets

(51) Int. Cl.
  *B62J 45/20* (2020.01)
  *B62K 11/02* (2006.01)
  *B62M 6/50* (2010.01)
  *B62M 6/90* (2010.01)
  *B62J 50/22* (2020.01)
  *B62K 15/00* (2006.01)
  *B62K 23/02* (2006.01)
  *B62K 23/08* (2006.01)
  *B62J 43/28* (2020.01)
  *B62J 25/04* (2020.01)

(52) U.S. Cl.
  CPC ............. *B62K 11/02* (2013.01); *B62K 15/00* (2013.01); *B62K 23/02* (2013.01); *B62K 23/08* (2013.01); *B62M 6/50* (2013.01); *B62M 6/90* (2013.01); *B62J 25/04* (2020.02); *B62J 43/28* (2020.02); *B62K 2015/003* (2013.01)

(58) Field of Classification Search
  CPC ..... B62K 2015/003; B62J 45/20; B62J 50/22; B62J 25/04; B62M 6/50; B62M 6/90
  USPC .......................................................... 180/21
  See application file for complete search history.

(56) References Cited

U.S. PATENT DOCUMENTS

| | | | |
|---|---|---|---|
| 9,358,901 B2* | 6/2016 | Shirakura | B62K 11/007 |
| 2007/0158117 A1* | 7/2007 | Alexander | B60L 50/52 |
| | | | 180/21 |
| 2011/0220427 A1* | 9/2011 | Chen | B62K 1/00 |
| | | | 180/21 |
| 2012/0217072 A1* | 8/2012 | Hoffmann | B62M 7/12 |
| | | | 180/21 |
| 2017/0120139 A1* | 5/2017 | Ma | A63C 17/12 |
| 2017/0190335 A1* | 7/2017 | Gillett | B62K 17/00 |
| 2018/0029662 A1* | 2/2018 | Acciardi | B62K 11/007 |
| 2018/0281889 A1* | 10/2018 | Evans | B62K 23/08 |
| 2020/0108885 A1* | 4/2020 | Evans | B62J 45/20 |

* cited by examiner

BALANCING VEHICLE AND CONTROL METHOD THEREFOR

TECHNICAL FIELD OF THE INVENTION

The present invention relates to electric travel tools, and more specifically to an intelligent electric balancing vehicle and a control method for the intelligent electric balancing vehicle.

BACKGROUND OF THE INVENTION

With the diversification of current travel, more and more vehicles are being launched to meet the increasingly diverse travel needs of people. Due to environmental protection and energy conservation, electric vehicles have been welcomed by most people as a means of transportation. However, most of the traditional electric vehicles are bulky, and they are not convenient to be carried on buses or subways, which has affected the further popularization of electric vehicles to some extent. Therefore, an electric balancing vehicle with a small volume and high portability solves the travel problem. However, the current electric balancing vehicle mainly has the following problems.

Firstly, in operation, the electric balancing vehicle can only be balanced by the driver itself, which is easy to cause danger.

Secondly, in the driving process of the traditional balancing vehicle, the vehicle is accelerated through inclining the vehicle body forward and is decelerated through inclining the vehicle body backward, which needs higher driving skills and is difficult to get started.

SUMMARY OF THE INVENTION

An object of the present disclosure is to provide a balancing vehicle, which can realize automatic balance control and improve driving safety.

To obtain the above-mentioned object, the present disclosure provides a balancing vehicle including a wheel, a bracket, a frame, a shock absorbing member, left and right pedals, a control rod, and a handle. The bracket is fixed to an axle of the wheel. The frame is slidably connected to the bracket through a slider fixedly connected to the bracket, so as to allow the frame to slide relative to the bracket. The shock absorbing member is disposed between the frame and the bracket, configured to cushion relative movement between the frame and the bracket. The left and right pedals are fixed to the frame. The control rod is configured to move back and forth in a direction of travel. The balancing vehicle accelerates when the control rod is pushed forward in the traveling direction, and the balancing vehicle decelerates or retreats when the control rod is pulled backward in the traveling direction. The handle is coupled to a top of the control rod.

In the balancing vehicle of the present disclosure, the bracket and the frame are configured in an inverted U shape, two sliders are fixed to opposite sides of the bracket in a width direction of the balancing vehicle, the frame defines two strip-shaped guide grooves in opposite sides therein in the width direction, so that the sliders can slide in the guide grooves, to allow the frame to slide relative to the bracket.

In the balancing vehicle of the present disclosure, an end of the shock absorbing member is fixed to a lower surface of a top end of the inverted U-shape of the frame, and the other end of the shock absorbing member is abutted against an upper surface of a top end of the inverted U-shape of the bracket, such that under the action of the shock absorbing member, the relative movement of the top end of the inverted U-shape of the bracket and the top end of the inverted U-shape of the frame is buffered.

In the balancing vehicle of the present disclosure, the left and right pedals are foldable, and after folding, the left and right pedals abut against opposite side surfaces of the frame, such that surfaces of the left and right pedals are in close contact with the side surfaces of the frame when the vehicle is observed from a front view.

In the balancing vehicle of the present disclosure, the control rod is hollow, and a charging battery is placed inside the control rod.

In the balancing vehicle of the present disclosure, the bracket is made of cold-rolled plate material.

In the balancing vehicle of the present disclosure, the frame and the control rod are made of carbon fiber material.

In the balancing vehicle of the present disclosure, the balancing vehicle further includes at least one fender fixed to the bracket.

In the balancing vehicle of the present disclosure, a display device is disposed at the top of the control rod, configured to display states of the balancing vehicle.

In the balancing vehicle of the present disclosure, a headlight is disposed at an upper front portion of the control rod, and a tail light is disposed at a lower back portion of the control rod.

In the balancing vehicle of the present disclosure, the balancing vehicle further includes a control unit, the control unit includes:

A controller, and a GPS module;

A speed sensor configured to measure a travel speed of the balancing vehicle;

A balance sensor configured to detect whether the balancing vehicle is in a balanced state;

and

A communication module configured to be communicatively connected to an intelligent terminal;

The present disclosure further provides a control method for a balancing vehicle, including:

Step S100, determining whether the balancing vehicle is in use; if the balancing vehicle is in use, step S101 is performed; if the balancing vehicle is not in use, step S105 is performed;

Step S101, accelerating the balancing vehicle through pushing the control rod forward;

Step S102, decelerating or retreating the balancing vehicle through pulling the control rod backward;

Step S103, inclining the wheel to the left through applying more force on the left pedal, so as to make the balancing vehicle turn left;

Step S104, inclining the wheel to the right through applying more force on the right pedal, so as to make the balancing vehicle turn right;

S105, detecting whether the balancing vehicle is in balance through the balance sensor; if the balancing vehicle is in balance, the balancing vehicle keeps in balance; if the balancing vehicle is not in balance, controlling the balancing vehicle in balance through the controller.

The present disclosure further provides another control method for a balancing vehicle, including:

Step S200, connecting the intelligent terminal through the communication module;

Step S201, determining whether the balancing vehicle is in use; if the balancing vehicle is in use, step S202 is performed; if the balancing vehicle is not in use, step S204 is performed;

Step S202, controlling the balancing vehicle to move forward, decelerate, or retreat through the intelligent terminal;

Step S203, inclining the wheel to the left through applying more force on the left pedal, so as to make the balancing vehicle turn left; or inclining the wheel to the right through applying more force on the right pedal, so as to make the balancing vehicle turn right;

Step S204, detecting whether the balancing vehicle is in balance through the balance sensor; if the balancing vehicle is in balance, the balancing vehicle keeps in balance; if the balancing vehicle is not in balance, controlling the balancing vehicle in balance through the controller.

The technical effect of the present disclosure is that automatic balance is realized through the balance sensor and the controller, so as to improve the safety degree of driving. Furthermore, the control rod is used to control the forward or backward movement of the balancing vehicle, which is easier to get started and safer than to control by the driver's own balance.

DETAILED DESCRIPTION OF THE INVENTION

In order to make the objects, technical solutions, and advantages of the present invention more comprehensible, the present invention will be further described in detail below with reference to the embodiments. It is understood that the embodiments described herein are merely illustrative of the invention and are not intended to limit the invention.

The steps in the present invention are not limited to the order of the steps unless the context clearly dictates the order of the steps or the execution of a step requires other steps as a basis, unless the context clearly dictates otherwise. The relative order of the steps can be adjusted. It will be understood that the term "and/or" as used herein relates to and encompasses any and all possible combinations of one or more of the associated listed items. As used herein, "front" and "rear" refer to the front and back of the direction of travel.

Referring to FIGS. 1-4, the present disclosure provides a balancing vehicle including a main body and a control unit. The main body includes a wheel 101, a bracket 102, a frame 103, a shock absorbing member 104, and left and right pedals 105.

Figure 1:
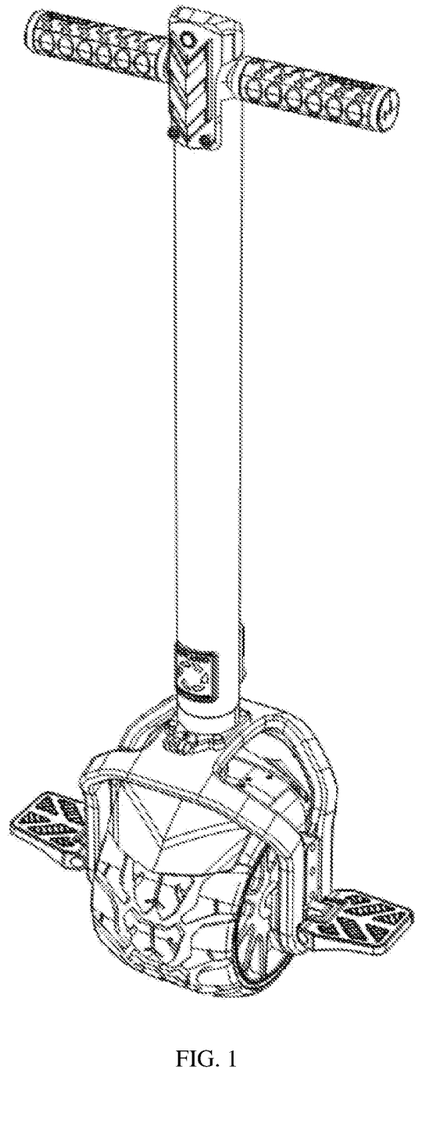
FIG. 1 is an isometric view of an embodiment of the present disclosure.
Figure 2:
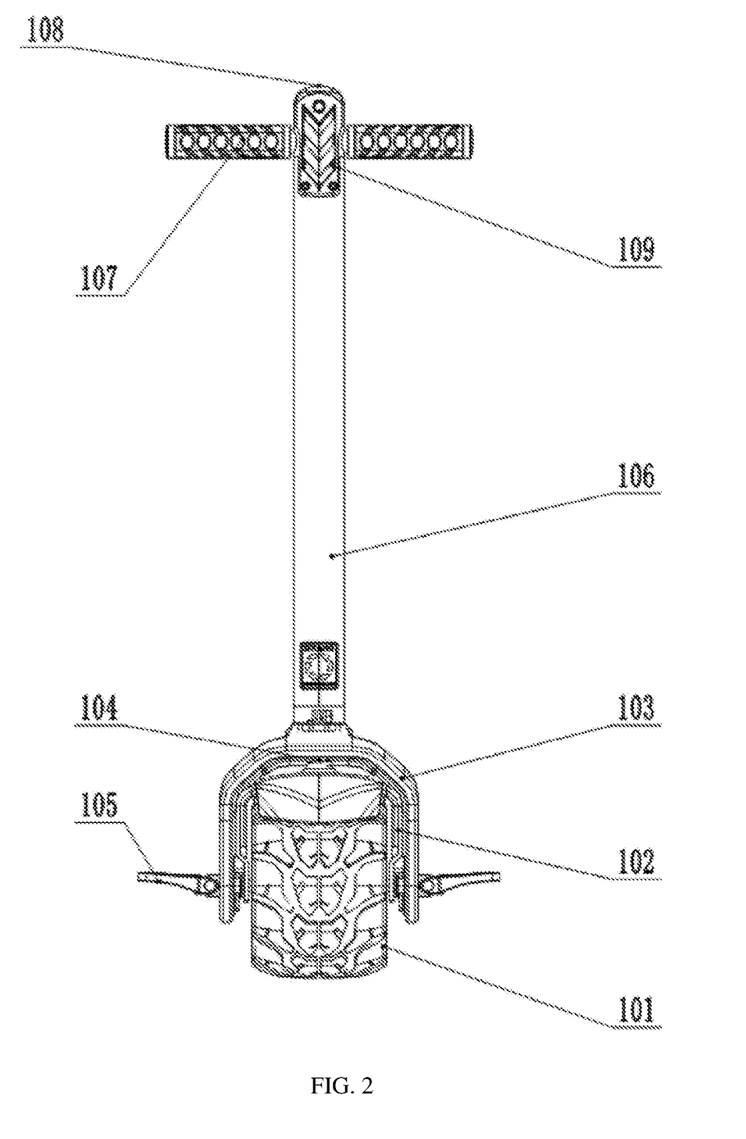
FIG. 2 is a front elevational view of the balancing vehicle of FIG. 1.
Figure 3:
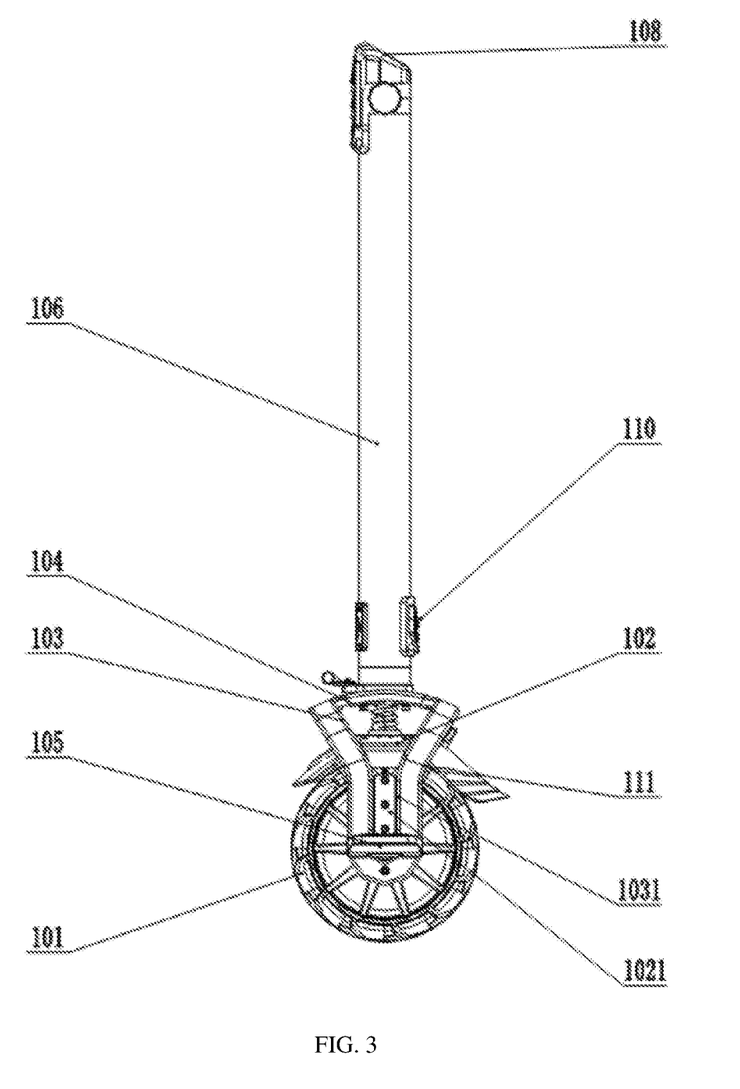
FIG. 3 is a right side elevational view of the balancing vehicle of FIG. 1.

The bracket 102 is fixed to an axle of the wheel 101. The bracket 102 is inverted U-shaped. In another embodiment of the present disclosure, the bracket 102 may includes a first bracket and a second bracket stacked together to enhance the strength of the bracket. The bracket 102 is made of high-strength material, and preferably the bracket 102 is made of cold-rolled plate (SPCC) material.

The frame 103 is slidably coupled to the bracket 102 through two sliders 1021 fixedly coupled to the bracket 102, such that the frame 103 can slide relative to the bracket 102. The frame 103 is also configured in an inverted U shape, and the frame 103 defines two strip-shaped guide grooves 1031 in opposite sides of the vehicle in a width direction, so that the sliders 1021 can slide in the guide grooves 1031. The frame 103 is made of lightweight high-strength material, and preferably the frame 103 is made of carbon fiber material.

The shock absorbing member 104 is disposed between the frame 103 and the bracket 102, and configured to cushion relative movement between the frame 103 and the bracket 102. In the embodiment, an end of the shock absorbing member 104 is fixed to a lower surface of a top end of the inverted U-shape of the frame 103, and the other end of the shock absorbing member 104 is abutted against an upper surface of a top end of the inverted U-shape of the bracket 102, such that under the action of the shock absorbing member 104, the relative movement of the top end of the inverted U-shape of the bracket 102 and the top end of the inverted U-shape of the frame 103 is buffered.

The pedals 105 are fixed to the frame 103. In one embodiment of the present disclosure, the pedals 105 can be folded, and after folding, the pedals 105 can abut against opposite side surfaces of the frame 103, such that surfaces of the pedals 105 are in close contact with the side surfaces of the frame 103 when the vehicle is observed from a front view. The pedals 105 are provided with anti-skid devices.

The main body further includes a control rod 106 and a handle 107. The control rod 106 can move back and forth in the direction of travel. When the driver pushes the control rod 106 forward in the traveling direction, the balancing vehicle accelerates. When the driver pulls the control rod 106 backward in the traveling direction, the balancing vehicle decelerates or retreats. The control rod 106 is made of lightweight and high strength material. In one embodiment of the present disclosure, the control rod 106 is made of carbon fiber material. In an embodiment of the present disclosure, the control rod 106 is hollow, and a charging battery is placed inside the control rod 106. Therefore, the space can be further utilized, and the overall volume of the balancing vehicle can be reduced. The control rod 106 is provided with a display device 108 at the top and a headlight 109 at the upper front portion, and a tail light 110 at the lower back portion of the control rod 106. The display device 108 is configured to display the states of the balancing vehicle, including information such as location, travel speed, connection status, power consumption, and the like.

The handle 107 is coupled to the top of the control rod 106. The balancing vehicle further includes front and rear fenders 111, and the front and rear fenders 111 are fixed to the bracket 102. In other embodiments of the present disclosure, the balancing vehicle may not include or include only one fender.

Figure 4:
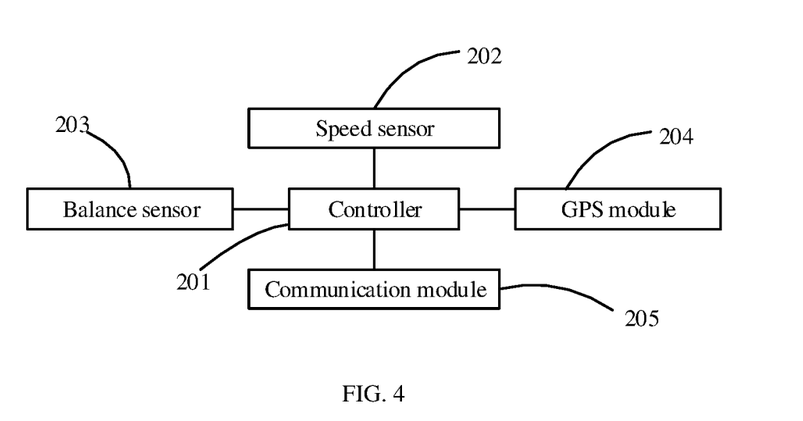
FIG. 4 is a block diagram of the balancing vehicle of the present disclosure.

Referring to FIG. 4, the control unit includes a controller 201, a speed sensor 202, a balance sensor 203, a GPS module 204, and a communication module 205. The speed sensor 202, the balance sensor 203, the GPS module 204, and the communication module 205 are electrically connected to the controller 201.

The balance sensor 203 is configured to detect whether the balancing vehicle is in a balanced state. In one embodiment of the present disclosure, the balance sensor 203 is a gyroscope. The communication unit 205 can be communicatively coupled to an intelligent terminal, to transmit the operational status of the balancing vehicle to the intelligent terminal. The communication connection may be a wired or wireless connection, preferably Bluetooth, WIFI, or other wireless connection.

Figure 5:
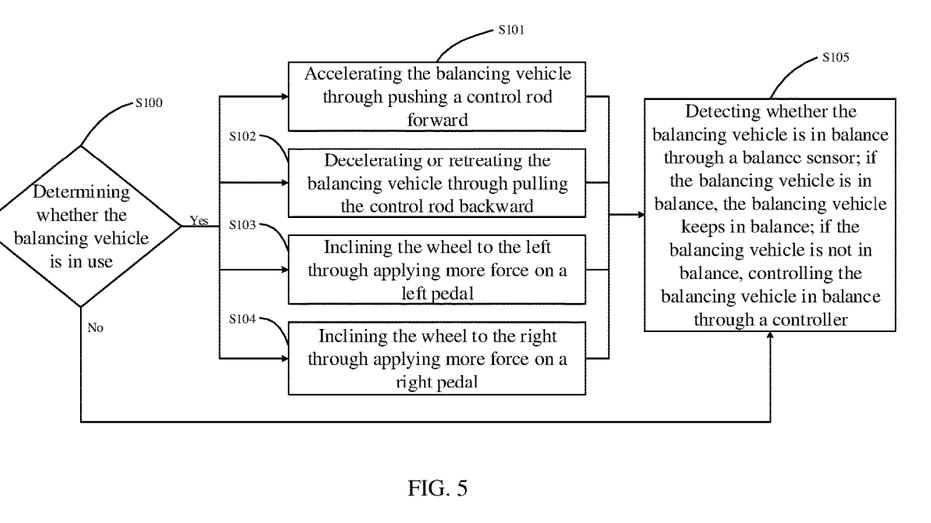
FIG. 5 is a flow chart of a control method for a balancing vehicle of an embodiment of the present disclosure.

Referring to FIG. 5, the present disclosure further provides a control method for a balancing vehicle including the following steps.

Step S100, determining whether the balancing vehicle is in use; if the balancing vehicle is in use, step S101 is performed; if the balancing vehicle is not in use, step S105 is performed.

Step S101, accelerating the balancing vehicle through pushing a control rod forward.

Step S102, decelerating or retreating the balancing vehicle through pulling the control rod backward.

Step S103, inclining the wheel to the left through applying more force on a left pedal, so as to make the balancing vehicle turn left.

Step S104, inclining the wheel to the right through applying more force on a right pedal, so as to make the balancing vehicle turn right.

Step S105, detecting whether the balancing vehicle is in balance through a balance sensor; if the balancing vehicle is in balance, the balancing vehicle keeps in balance; if the balancing vehicle is not in balance, controlling the balancing vehicle in balance through a controller.

Figure 6:
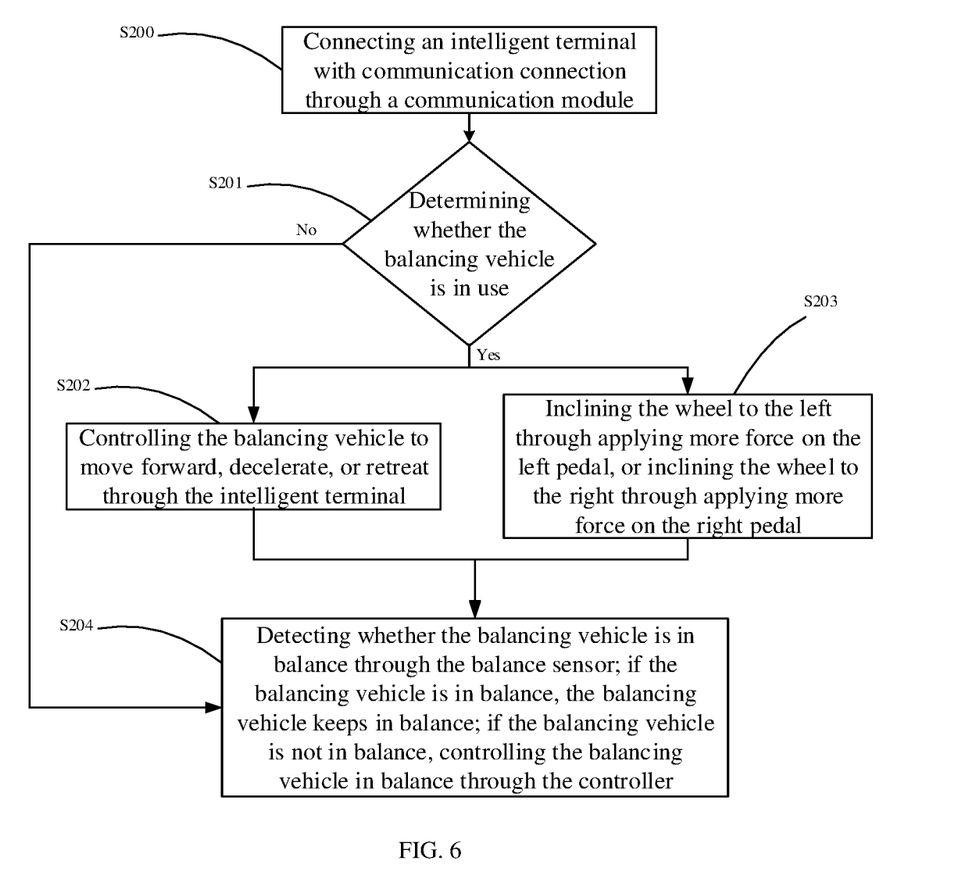
FIG. 6 is a flow chart of a control method for a balancing vehicle of another embodiment of the present disclosure.

Referring to FIG. 6, the present disclosure further provides another control method for a balancing vehicle including the following steps.

Step S200, connecting an intelligent terminal with communication connection through a communication module.

The communication connection can be wire or wireless connection, preferably, Bluetooth, WIFI, or other wireless connection.

Step S201, determining whether the balancing vehicle is in use; if the balancing vehicle is in use, step S202 is performed; if the balancing vehicle is not in use, step S204 is performed.

Step S202, controlling the balancing vehicle to move forward, decelerate, or retreat through the intelligent terminal.

Step S203, inclining the wheel to the left through applying more force on a left pedal, so as to make the balancing vehicle turn left; or inclining the wheel to the right through applying more force on a right pedal, so as to make the balancing vehicle turn right.

Step S204, detecting whether the balancing vehicle is in balance through a balance sensor; if the balancing vehicle is in balance, the balancing vehicle keeps in balance; if the balancing vehicle is not in balance, controlling the balancing vehicle in balance through a controller.

The technical effect of the invention is that automatic balance is realized through the balance sensor and the controller, so as to improve the safety degree of driving. Furthermore, the control rod is used to control the forward or backward movement of the balancing vehicle, which is easier to get started and safer than to control by the driver's own balance.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims rather than the above-mentioned description, from any point of view. All changes that come within the meaning and range of equivalents of the claims are therefore intended to be included within the present disclosure. Any reference signs in the claims should not be construed as limiting the claims.

In addition, it should be understood that although the description is described in terms of embodiments, not every embodiment includes only one independent technical solution. The description of the specification is merely for the sake of clarity, and those skilled in the art should regard the specification as a whole. The technical solutions in the respective embodiments may also be combined as appropriate to form other embodiments that can be understood by those skilled in the art.

What is claimed is:

1. A balancing vehicle, comprising:
a wheel;
a bracket fixed to an axle of the wheel;
a frame slidably connected to the bracket through a slider fixedly connected to the bracket, so as to allow the frame to slide relative to the bracket;
a shock absorbing member disposed between the frame and the bracket, and configured to cushion relative movement between the frame and the bracket;
left and right pedals fixed to the frame;
a control rod configured to move back and forth in a direction of travel, wherein the balancing vehicle accelerates when the control rod is pushed forward in the traveling direction; wherein the balancing vehicle decelerates or retreats when the control rod is pulled backward in the traveling direction; and
a handle coupled to a top of the control rod;
wherein the bracket and the frame are configured in an inverted U-shape, a top end of the inverted U-shape of the bracket is located above the wheel, two sliders are fixed to bottom ends of opposite sides of the bracket; a top end of the inverted U-shape of the frame is located above the top end of the inverted U-shape of the bracket, the frame defines two strip-shaped guide grooves in bottom ends of opposite sides of the frame, so that the sliders can slide in the guide grooves, to allow the frame to slide relative to the bracket; and
wherein an end of the shock absorbing member is fixed to a lower surface of the top end of the inverted U-shape of the frame, and the other end of the shock absorbing member is abutted against an upper surface of the top end of the inverted U-shape of the bracket, such that under the action of the shock absorbing member, the relative movement between the bracket and the frame is buffered.

2. The balancing vehicle of claim 1, wherein the left and right pedals are foldable, and after folding, the left and right pedals abut against opposite side surfaces of the frame, such that surfaces of the left and right pedals are in close contact with the side surfaces of the frame when the vehicle is observed from a front view.

3. The balancing vehicle of claim 2, wherein the control rod is hollow, and a charging battery is placed inside the control rod.

4. The balancing vehicle of claim 3, wherein the bracket is made of cold-rolled plate material.

5. The balancing vehicle of claim 4, wherein the frame and the control rod are made of carbon fiber material.

6. The balancing vehicle of claim 5, further comprising at least one fender fixed to the bracket.

7. The balancing vehicle of claim 6, wherein a display device is disposed at the top of the control rod, configured to display states of the balancing vehicle.

8. The balancing vehicle of claim 7, wherein a headlight is disposed at an upper front portion of the control rod, and a tail light is disposed at a lower back portion of the control rod.

9. The balancing vehicle of claim 1, further comprising a control unit, wherein the control unit comprises: a controller; a GPS module; a speed sensor configured to measure a travel speed of the balancing vehicle; a balance sensor configured to detect whether the balancing vehicle is in a balanced state; and a communication module configured to be communicatively connected to an intelligent terminal; wherein the speed sensor, the balance sensor, the GPS module, and the communication module are electrically connected to the controller.

10. A control method for the balancing vehicle of claim 9, comprising:
    step S100, determining whether the balancing vehicle is in use; if the balancing vehicle is in use, step S101 is performed; if the balancing vehicle is not in use, step S105 is performed;
    step S101, accelerating the balancing vehicle through pushing the control rod forward; step S102, decelerating or retreating the balancing vehicle through pulling the control rod backward;
    step S103, inclining the wheel to the left through applying more force on the left pedal, so as to make the balancing vehicle turn left;
    step S104, inclining the wheel to the right through applying more force on the right pedal, so as to make the balancing vehicle turn right; and
    step S105, detecting whether the balancing vehicle is in balance through the balance sensor; if the balancing vehicle is in balance, the balancing vehicle keeps in balance; if the balancing vehicle is not in balance, controlling the balancing vehicle in balance through the controller.

11. A control method for the balancing vehicle of claim 9, comprising:
    step S200, connecting the intelligent terminal through the communication module;
    step S201, determining whether the balancing vehicle is in use; if the balancing vehicle is in use, step S202 is performed; if the balancing vehicle is not in use, step S204 is performed;
    step S202, controlling the balancing vehicle to move forward, decelerate, or retreat through the intelligent terminal;
    step S203, inclining the wheel to the left through applying more force on the left pedal, so as to make the balancing vehicle turn left; or inclining the wheel to the right through applying more force on the right pedal, so as to make the balancing vehicle turn right; and
    step S204, detecting whether the balancing vehicle is in balance through the balance sensor; if the balancing vehicle is in balance, the balancing vehicle keeps in balance; if the balancing vehicle is not in balance, controlling the balancing vehicle in balance through the controller.

* * * * *